United States Patent [19]
Clark

[11] 3,891,862
[45] June 24, 1975

[54] COMPACT UNIT BREAKER

[75] Inventor: Thomas F. Clark, Canton, Mass.

[73] Assignee: Allis-Chalmers Corporation, Milwaukee, Wis.

[22] Filed: June 26, 1973

[21] Appl. No.: 373,789

[52] U.S. Cl. ............................... 307/125; 317/103
[51] Int. Cl.² ...................................... H01H 47/00
[58] Field of Search .......... 307/125, 94; 200/148 R, 200/148 A, 148 B, 148 C, 148 D, 148 E, 148 F, 148 G, 148 H, 148 J, 56, 50 C; 317/103

[56] References Cited
UNITED STATES PATENTS

| | | | |
|---|---|---|---|
| 1,749,560 | 3/1930 | Brown | 200/50 C |
| 1,884,580 | 10/1932 | Corneliussen | 317/103 |
| 3,207,878 | 9/1965 | Friedrich et al. | 200/148 B |
| 3,676,624 | 8/1972 | Mauthe | 200/148 B |
| 3,823,346 | 7/1974 | Olsen | 317/103 |

*Primary Examiner*—Robert K. Schaefer
*Assistant Examiner*—M. Ginsburg
*Attorney, Agent, or Firm*—Robert C. Jones

[57] ABSTRACT

A circuit breaker having gas insulated compartmentalized components comprising disconnect switches, current transformers, ground switches and terminations arranged in a compact assembly and which are accessible from ground level. The compact arrangement permits a low profile which improves seismic withstand characteristics and facilitates maintenance of the assembly and enables a very high degree of factory preassembly thereby reducing field assembly.

5 Claims, 3 Drawing Figures

3,891,862

COMPACT UNIT BREAKER

BACKGROUND OF THE INVENTION

The present invention relates to a metal enclosed gas-insulated circuit breaker arrangement which includes at least two disconnect switches, a bypass disconnect switch, two transformers and grounding switches.

Metal enclosed gas-insulated circuit breakers are known and are utilized in urban locations and environments in which minimum space is available for substation installations. However, known installations such as disclosed in U.S. Pat. Nos. 2,288,650; 3,235,774; 3,348,001; 3,578,927; and 3,676,624 utilize standard construction which has totally ignored the structural profile of the installations and its compatibility with the area in which it is to be located. Also, present day utility construction requirements, especially in the electrical utility area, require that installations incorporate designs which have greater seismetic withstand capabilities. Prior known structures have not included or considered seismetic withstand capabilities in their designs. Further, known structures do not incorporate an electrical bypass arrangement which isolates the circuit breaker so that the circuit breaker may be serviced and still provide a safe electrical current path through the installation.

SUMMARY OF THE INVENTION

It is an object of the invention to provide a metal enclosed gas-insulated circuit breaker arrangement with metal enclosed gas-insulated components and one that is compact and can be assembled and tested in the factory and that requires a minimum of field assembly.

Still another object of the invention is to provide a circuit breaker arrangement with a low profile construction without sacrificing any functional operation.

Yet another object of the invention is to provide a metal enclosed gas-insulated circuit breaker having greater seismetic withstand capabilities.

Another object of the invention is to provide a metal enclosed gas-insulated circuit breaker arrangement having gas-insulated components operatively arranged for selectively establishing a gas-insulated electric path around the circuit breaker.

Yet another object of the invention is to provide a metal enclosed gas-insulated circuit breaker having gas-insulated electrical bypass means which includes associated current transformers for establishing an electric current path around the circuit breakers.

DESCRIPTION OF THE PREFERRED EMBODIMENT

Figure 1:
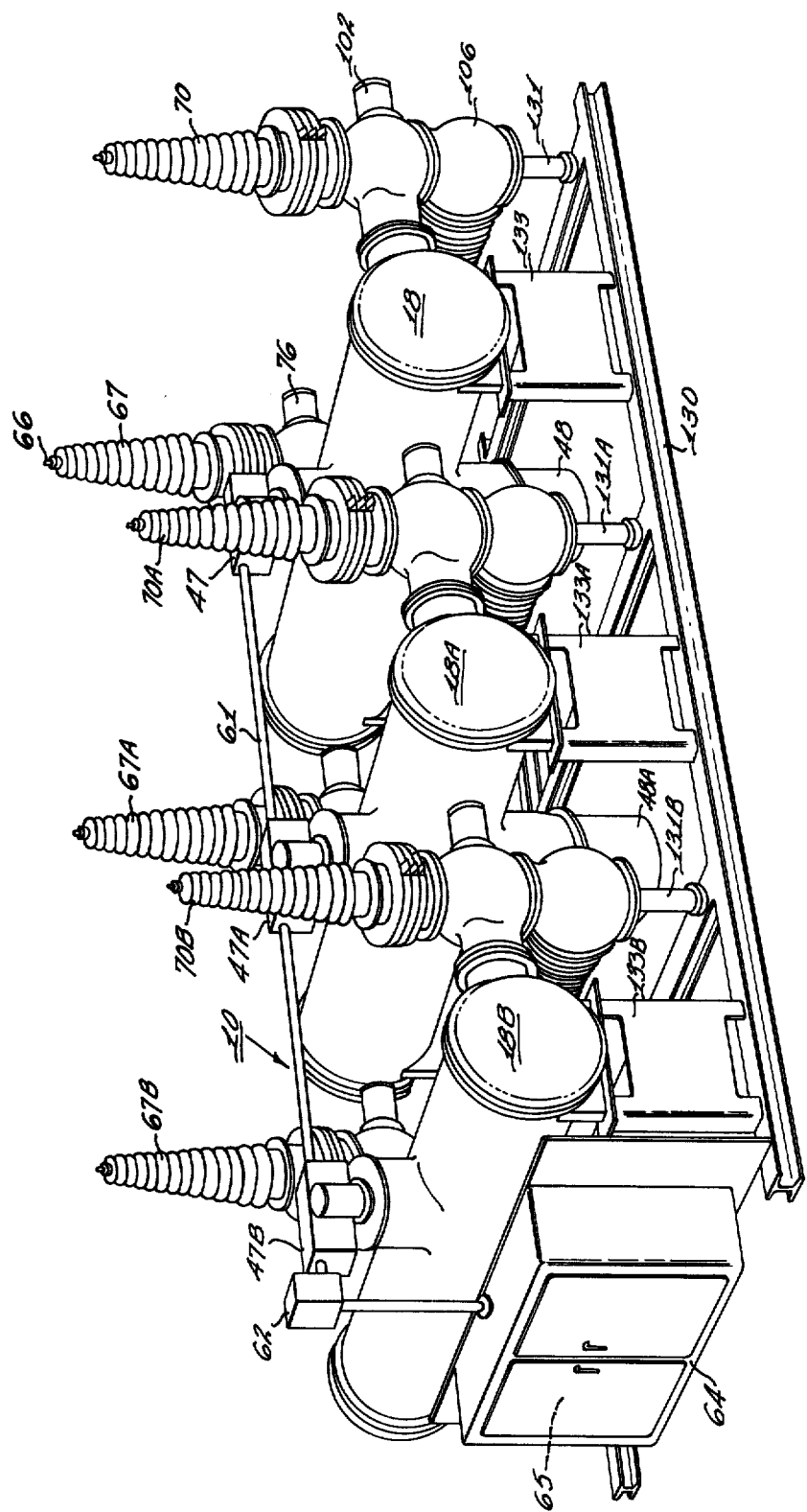
FIG. 1 is a perspective view of a three-phase metal enclosed gas-insulated circuit breaker arrangement in which the features of the invention are incorporated.

Referring now to the drawings, a three-phase circuit breaker arrangement 10 is depicted. The three-phase arrangement comprises three circuit breaker modules 18, 18A and 18B, each of which is identical in construction and arrangement. Thus, a description of the circuit breaker module 18 will also apply to the modules 18A and 18B with like part being identified with the same reference numbers followed by the unit identifying suffix letter.

Figure 2:
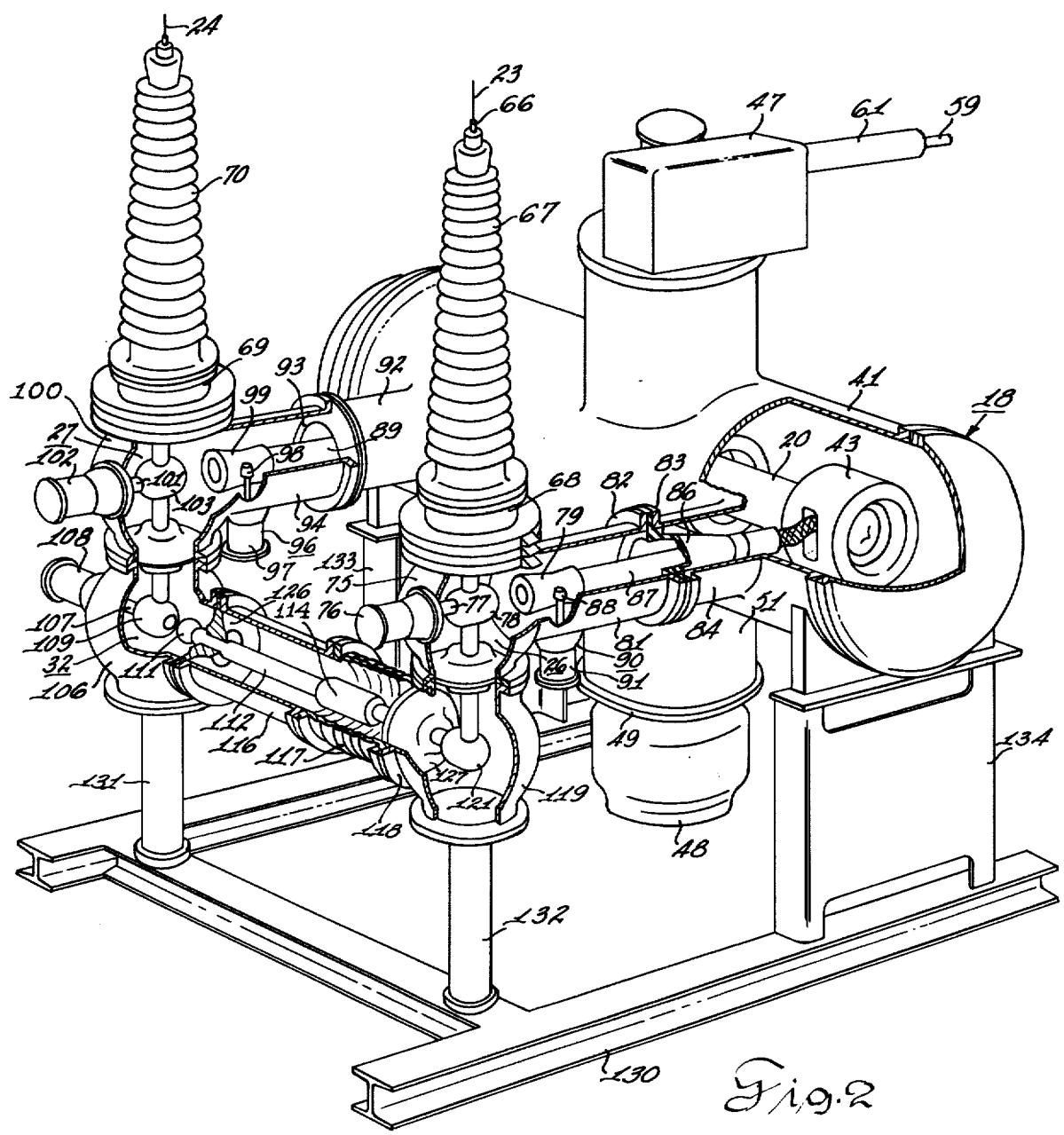
FIG. 2 is a perspective view of a single phase of the circuit breaker arrangement of FIG. 1 as viewed from the right of FIG. 1; and, FIG. 3 is a schematic view of the internal electrical arrangement of one phase of the circuit breaker arrangement depicted.
Figure 3:
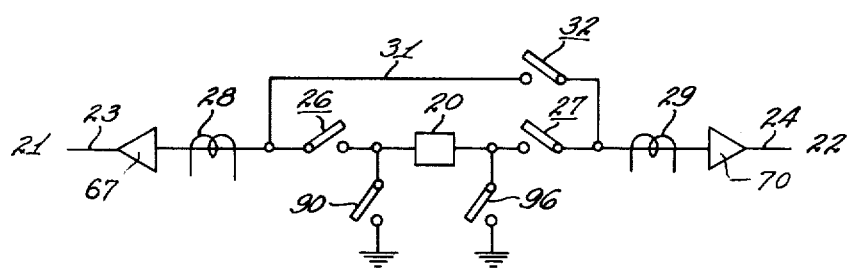

As shown in FIG. 2 the module 18 includes a circuit breaker means 20 which is operatively interposed between a power source 21 and a load 22, FIG. 3, via a transmission bus 23 and a load bus 24. It will be understood that the term "load" encompasses commercial, residential and industrial electrical requirements. Thus, hereinafter, reference will be made to "line side" and "load side," which references are utilized for convenience to designate the location of components with respect to the circuit breaker means 20 and/or the power source 21 or the load 22. Referring again to FIG. 3, the protective arrangement of the circuit breaker means 20 includes a pair of disconnect switches 26 and 27 which are connected to the transmission bus 23 and the load bus 24, respectively. A current sensing transformer 28 is inductively coupled to sense current in the transmission bus 23 at a position which is on the line side of the disconnect switch 26. Another current transformer 29 is inductively coupled to the load bus 24 at a position to the load side of the disconnect switch 27.

In order to service the circuit breaker means 20 without interrupting the circuit between the source 21 and the load 22, a bypass circuit 31 is provided. As shown, the bypass circuit 31 includes a bypass disconnect switch 32. The bypass disconnect switch is connected to the transmission bus 23 at a position to the line side of the disconnect switch 27. The opposite terminal of the bypass disconnect switch 32 is connected to the load bus 24 at a position to the load side of the disconnect switch 27. Thus, whenever the circuit breaker means 20 requires servicing or inspection, such work can be accomplished without interrupting the circuit to the load 22. This is accomplished by closing the bypass disconnect switch 32 thereby establishing a maintaining circuit around the circuit breaker means 20. With the maintaining circuit through the bypass disconnect switch 32 established, the disconnect switches 26 and 27 may both be opened to thereby isolate the circuit breaker means 20. It is to be noted that with the arrangement described the current sensing transformers 28 and 29 both remain operative to sense the current in the line bus 23 and the load bus 24, respectively, independently of the outage of the circuit breaker means 20.

The protective components described above are enclosed in metal housings which are sealed and which contain insulating medium such as $SF_6$ dielectric gas at a relatively low pressure. The circuit breaker unit also used the $SF_6$ dielectric gas to extinguish the arc drawn between contacts upon the opening of the circuit breaker.

The circuit breaker means 20 is disposed within a tank 41 that is supported on a pair of pedestals 133 and 134. The circuit breaker means 20 includes a pair of serially connected interrupter contact and gas blast valve units 43, the right end unit as viewed in FIG. 2, being illustrated, which are electrically connected in series through a centrally located supporting housing or casting (not shown). The interrupter contact and gas blast valve unit 43, as well as the centrally disposed supporting housing are disposed within tank 41 in which the SF₆ dielectric gas is contained at a relatively low pressure. The synchronous operation of the movable interrupter contacts and the gas blast valves (not shown) of the units 43 are effected by pole unit mechanisms or operators 47 connected internally through suitable operating linkage to the contacts.

Gas at a relatively high pressure is contained within a supply tank 48 which is secured in gas-tight relationship to a mounting flange 49 integrally formed on the end of the circular support 51. Gas from the high pressure tank 48 is directed to the central support housing (not shown) by means of a supply pipe which has gas-tight fitting relationship with the housing and the supply tank.

Each of the other modules 18A and 18B are provided with individual pole unit mechanisms or operators 47A and 47B which are operatively connected together for synchronous operation by means of a longitudinally extending horizontal rod 59 which is supported for reciprocation in the tubular casing 61. The rod 59 extends from the operators 47 through the operators 47A and 47B and has operative connection with the associated contacts of the interrupter contact and blast valve unit 43 of each module. As viewed in FIG. 1, the left end of the tubular casing 61 terminates within a motion transfer box 62 so that the operating rod 59 has an operative connection with the upper end of a vertical rod (not shown) which terminates within the motion transfer box 62. The lower depending end of the vertical rod (not shown) extends downwardly into a control box 64 and has an operative connection with a power source 65 contained therein. Operation of the power source 65 upon a proper signal obtained from a source (not shown) will effect an upward movement of the vertical rod (not shown) thereby moving the rod 59 in a direction to affect closing movement of the contacts associated with the interrupter contact and blast valve units 43 and similar units associated with the modules 18A and 18B. On the other hand, operation of the power source (not shown) in the opposite direction will effect the synchronous opening movement of the contacts associated with the interrupter contact and gas blast valve unit 43 and similar units associated with the modules 18A and 18B.

The transmission bus 23 is electrically connected to an electrical terminal connector 66 carried at the outer end of a terminal bushing 67. The transmission bus 23 continues through the terminal bushing 67 and through a current transformer housing 68. Support for the terminal bushing 67 on the transformer housing 68 is afforded by means of a gas sealed flange-to-flange relationship effected between the lower end of the bushing 67 with the upwardly facing end of the transformer housing 68. The lower flange end (not shown) of the current transformer housing 68 mates with and is bolted in gas sealed relationship to a top circular flange (not shown) formed on a disconnect switch housing 75. Supported in operative position within the housing 75 is the disconnect switch 26 which includes an operator 76 which actuates a moving contact 77 axially into electrical engagement with a conductor bracket 78. The upper end of the bracket 78 receives the bus 23 in electrically secured relationship thereto. The operator 76 is operative to effect the inward axial movement of the movable contact of the switch through the bracket 78 and into electrical conducting engagement with a stationary contact bracket 79 that extends leftwardly into a tubular circular extension 81 of the disconnect housing 75. The rightwardly extending end of the cylindrical extension 81 is provided with a circular flange 82 which mates with and is bolted in gas-tight relationship to a circular flange 83 formed on a leftwardly extending cylindrical extension 84 of the circuit breaker housing 41. A sealed relationship between the flanges 82 and 83 is effected by means of a gas barrier 86.

Electrical continuity is established from the disconnect switch 26 to the end of the contact and blast valve unit 43 via a horizontally extending connecting conductor 87 which has communication with the electrical contact bracket 79 supported within the ground switch housing 81. The bracket 79 cooperates with a movable contact 88 which is a part of the ground switch 90 and which is moved axially into and out of engagement with the bracket 79 by means of an operator 91. The opposite side of the bracket 79 has electrical connection with the conductor 87 that is supported in coaxial relationship within the horizontal housing 81 and which also extends through the supporting gas barrier 86. The opposite end of conductor 87 is electrically connected to the end of the contact and blast valve unit 43. The continuity of the electrical circuit continues through the closed contacts of the interrupter contact and blast valve unit 43 through the supporting central housing (not shown) and through the closed contacts of the other contact and gas blast valve unit (not shown). At the left end of the circuit breaker 41 an electrical conductor 89 is electrically secured thereto and extends horizontally in coaxial relationship through the horizontal housing extension 92 and through a supporting gas barrier member 93 into the grounding switch housing 94. Within the housing 94 the grounding switch 96, similar in all respects to the switch 90, is supported. An operator 97 associated with the grounding switch 96 actuates the grounding contact 98 into and out of engagement with an electrical contact bracket 99 to which the conductor 89 is electrically secured. The electrical continuity continues through the disconnect switch 27 disposed within a disconnect switch housing 100 via an axially movable contact rod 101 which is actuated by an operator 102. The axial movable contact rod 101 is adapted to move through a bracket 103 into electrical engagement with the contact bracket 99. The bracket 103 has electrical connection with the load bus 24 which is adapted to supply power to the load 22.

As previously mentioned, a bypass circuit 31 is provided for establishing a maintaining circuit around the disconnect switches 26 and 27 whenever the circuit breaker means 20 is out of service for servicing or other reasons. To this end the bypass disconnect switch 32 is located within a bypass disconnect switch housing 106. The bypass switch 32 includes an axially movable contact rod 107 that is operated by means of an operator 108 through a contact bracket 109 into and out of engagement with a contact bracket 111 to which an electrical conductor 112 is electrically connected. With the contact rod 107 in engagement with the contact bracket 111 an electrical circuit is established through the disconnect switch 27 to the bypass switch 32. From the contact bracket 111 the electrical conductor 112 having an expansion and contraction section 114 extends through a connecting housing 116 which has sealed engagement with the flanged end of the bypass switch housing 106. Interposed between the intermediate connecting housing bracket there is provided an expansion and contraction housing portion 117 which is longitudinally adjustable in accordance with temperature variations in the environment in which the unit 10 will be located. The expansion and contraction housing portion 117 also serves to provide alignment and tolerance compensation. At its opposite end the expansion housing is secured in sealed relation to an entrance port 118 of a corner housing 119 in which an electrical bracket 121 is contained and to which the conduit 112 is electrically secured. As shown in FIG. 2, the conductor 112 is supported within the axially aligned housings 116 and 117 in coaxial relationship by means of an insulator support 126. A similar arrangement is provided between the end of the expansible housing 117 and the housing 119. To this end an insulator support 127 is provided and is disposed within the housing 117 at the right end thereof, as viewed in FIG. 2, and is operatively arranged to support the conductor 112.

In operation when the contact rod 101 of the disconnect switch 27 is moved out of engagement with the contact bracket 99, the electrical circuit to the circuit breaker means 41 is interrupted. However, the arrangement is such that the contact rod 101 in being moved out of engagement with the contact bracket 99 maintains an electrical engagement with the contact bracket 103. Thus, an electrical circuit to the bypass switch 32 contact bracket 109 is maintained. Therefore, when the contact rod 107 of the bypass switch 32 is in closed position in engagement with the contact bracket 111, a circuit is established between the buses 23 and 24 through the disconnect switch 27 and the bypass conductor 112.

It should be noted that all the disconnect switch housings and bypass switch housings and the other associated housings are all short coupled members which serve to establish a compact arrangement for the module 18 and also to establish a rigid strong supporting structure which includes the flexible housing portion 117 which compensates for temperature variations and also improves the seismetic withstand capabilities of the unit.

It will be noted that modules 18, 18A and 18B are supported on a portable base or skid 130 which in effect becomes part of the unit 10 so that the entire unit may be constructed and arranged in the factory as a complete unit. In moving unit 10 from the factory to the place of utilization, the terminal bushings 67 and 70 are removed and the openings of the current transformer housing 68 and 69 are sealed to prevent contamination from entering into the units. Thus, when the unit is installed it is only necessary to remount the terminal bushings in their proper location and then charge the unit with the dielectric insulating gas to the required internal pressure.

As mentioned, the modules 18, 18A and 18B are supported on the base 130 by means of the pedestals 131 and 132. Thus, the circuit breaker housing is supported in position by pedestals 133 and 134, while the pedestals 131 and 132 support the outrigger arrangement of the disconnect and bypass switch housings as shown.

The embodiments of an invention in which an exclusive property or privilege is claimed are defined as follows:

1. In a compact single phase power circuit breaker assembly comprising a plurality of operative gas sealed units including;

a portable supporting base;
an upstanding U-shaped enclosure mounted on said base for movement with said base, said U-shaped enclosure including an assembly of gas sealed housings in which electrical operating components are disposed;
a gas sealed interrupter tank supported on said base for movement with the base and extending parallel to said U-shaped enclosure, said tank operatively supporting at least one circuit interrupter therein;
a horizontal gas sealed housing interconnecting a gas sealed housing of each upstanding leg of said U-shaped enclosure with an adjacent end of said interrupter tank, the horizontal gas sealed housings being disposed in parallel spaced apart relationship in the same horizontal plane;
an electrical circuit interrupter disconnect switch in a gas sealed housing of each leg of said U-shaped enclosure to which said interrupter tank interconnecting housings are connected, the disconnect switch of each leg being operable to interrupt the circuit through the horizontal parallel interconnecting housing for isolating each side of the circuit interrupter; and,
a bypass disconnect switch in a gas sealed housing of at least one of said legs of said U-shaped enclosure and operable to establish a bypass circuit from the circuit interrupter disconnect switch of the associated leg of the U-shaped enclosure through the base of the U-shaped enclosure and through the circuit interrupter disconnect switch in the sealed housing of the other leg of said U-shaped enclosure.

2. A compact circuit breaker assembly according to claim 1 wherein said U-shaped enclosure includes a base portion having an expansion section to accommodate for temperature variations and to increase the seismetic withstand of the assembly, said expansion section also operating to provide compensation errors due to manufacturing tolerance and to provide flexibility in alignment.

3. A compact circuit breaker assembly according to claim 2 wherein each of said horizontal parallel interconnecting housings includes a grounding switch each operable when actuated to connect the opposite ends of said interrupter to ground.

4. In a compact single phase circuit breaker assembly comprising a plurality of operative gas sealed units including;

a portable base supporting structure;
a circuit breaker unit having at least one interrupter therein, said circuit breaker unit being supported on said base supporting structure;
a pair of power transfer switch gas sealed units connected in series with said circuit breaker unit for isolating said interrupter;
a bypass power transfer switch gas sealed unit having conductor means therein connected in series with one of said power transfer switch gas sealed units to establish a bypass circuit around said circuit interrupter when said power transfer switch units have operated to isolate said interrupter;
a gas sealed current transformer unit connected to the energized side of each of said power transfer switch gas sealed units so as to be in circuit regardless of the condition of said power transfer switch gas sealed units;

a pair of air-to-gas bushings constructed to present external line terminals, said bushings being connected in sealed relationship to an associate current transformer unit;

one air-to-gas bushing, one current transformer unit, one power transfer switch gas sealed unit and one bypass power transfer switch gas sealed unit being arranged in a first stacked array and supported on said base supporting structure independently of said circuit breaker unit, the other air-to-gas bushing, the other current transformer unit and the other power transfer switch gas sealed unit being arranged in a second stacked array and supported on said base supporting structure independently of said first stacked array and said circuit breaker unit;

a gas sealed housing including an expansible housing section interconnecting said first and second stacked arrays and serving as the bypass circuit enclosure; and, gas sealed enclosures including conductor means therein extending between said power transfer switch gas sealed units and said circuit breaker unit and serving as the enclosures for a main circuit path through said interrupter.

5. In a compact power circuit breaker comprising three individual phase assemblies mounted independently of each other;

each phase assembly being identical and each including an elongated cylindrical gas sealed interrupter tank supported on a base, said interrupter tank having at least one circuit interrupter therein;

a generally U-shaped housing assembly comprising a plurality of gas sealed enclosures, said enclosures of each of the legs of said U-shaped housing assembly being identical in configuration and arranged in stacked interconnecting array, with each stacked array being supported on said base independent of each other and of said interrupter tank;

one stacked array comprising a gas sealed bypass disconnect switch housing including a bypass disconnect switch therein;

a gas sealed circuit breaker disconnect switch housing including a circuit breaker disconnect switch within said circuit breaker disconnect housing, said circuit breaker disconnect switch housing being mounted on said bypass disconnect switch housing and said circuit breaker disconnect switch being electrically in communication with said bypass disconnect switch and said circuit interrupter without interrupting the integrity of the gas sealed enclosures;

a current transformer housing mounted on said circuit breaker disconnect switch housing in gas sealed relationship, said current transformer housing including a current sensing transformer;

an air-to-gas bushing carried by said current transformer housing and having an electrical conductor extending outwardly of said bushing to present a terminal end, and said conductor extending through said bushing and said current sensing transformer and into electrical connection with said circuit breaker disconnect switch;

a gas sealed ground switch housing extending between said circuit breaker disconnect switch housing and one end of said interrupter tank, said gas sealed ground switch housing including a grounding switch having electrical connections with one side of said circuit interrupter;

the other stacked array comprising a gas sealed corner housing including a corner electrical connection therein;

a gas sealed circuit breaker disconnect switch housing including a circuit breaker disconnect switch therein mounted on said gas sealed ground switching housing, said disconnect switch having electrical connection with said circuit interrupter and with said corner electrical connection;

a current transformer housing mounted on said circuit breaker disconnect switch housing in gas sealed relationship, said current transformer housing including a current sensing transformer;

an air-to-gas bushing carried by said current transformer housing and having an electrical conductor extending outwardly thereof to present a line terminal end, said electrical conductor extending through said current transformer and into electrical connection with said circuit breaker disconnect switch;

a gas sealed ground switch housing extending between said circuit breaker disconnect switch housing of the other array and the other end of said interrupter tank, said ground switch housing including a grounding switch having electrical connection with the opposite side of said interrupter; and, a gas sealed bypass conductor housing interconnecting said bypass disconnect switch housing of the said one stacked array with said gas sealed corner housing of the other stacked array, said gas sealed bypass conductor housing including an expansion section, said bypass conductor housing including a conductor having an expansion section electrically connected to said bypass disconnect switch and said corner electrical connection;

whereby said circuit breaker disconnect switches of the stacked arrays may be closed and said bypass disconnect switch opened to establish an electrical circuit from the external terminal end of one said bushing to the external terminal end of the other of said bushing through said interrupter or said circuit breaker disconnect switches of the stacked arrays may be operated to isolate both sides of said interrupter from said terminal ends of said bushings and said bypass disconnect switch operated to establish a bypass circuit from one terminal end to the other terminal end around said interrupter and said grounding switches operated to ground both sides of said interrupter.

* * * * *